(12) United States Patent
Gorka et al.

(10) Patent No.: US 11,301,236 B2
(45) Date of Patent: Apr. 12, 2022

(54) UPDATING COMPONENTS OF A MODULAR SYSTEM

(71) Applicant: WAGO Verwaltungsgesellschaft mit beschraenkter Haftung, Minden (DE)

(72) Inventors: Juergen Gorka, Minden (DE); Jonathan Jansen, Minden (DE)

(73) Assignee: WAGO Verwaltungsgesellschaft mit beschraenkter Haftung, Minden (DE)

( * ) Notice: Subject to any disclaimer, the term of this patent is extended or adjusted under 35 U.S.C. 154(b) by 0 days.

(21) Appl. No.: 16/933,736

(22) Filed: Jul. 20, 2020

(65) Prior Publication Data
US 2021/0019138 A1 Jan. 21, 2021

(30) Foreign Application Priority Data
Jul. 18, 2019 (DE) .......................... 102019119487.3

(51) Int. Cl.
| | | |
|---|---|---|
| *G06F 9/44* | (2018.01) | |
| *G06F 8/65* | (2018.01) | |
| *G05B 19/042* | (2006.01) | |
| *G06F 8/71* | (2018.01) | |
| *H04L 9/32* | (2006.01) | |
| *G05B 23/02* | (2006.01) | |
| *G09C 1/00* | (2006.01) | |

(52) U.S. Cl.
CPC ........... *G06F 8/65* (2013.01); *G05B 19/0423* (2013.01); *G05B 19/0426* (2013.01); *G06F 8/71* (2013.01); *G05B 23/0283* (2013.01); *G05B 2219/25145* (2013.01); *G09C 1/00* (2013.01); *H04L 9/3247* (2013.01)

(58) Field of Classification Search
CPC .. G06F 8/65; G06F 21/64; G06F 8/71; H04N 21/2146; G05B 19/05; G05B 19/042; G05B 19/0423; G05B 19/0426; G05B 2219/25145; G05B 23/0283; G09C 1/00; H04L 9/3247
See application file for complete search history.

(56) References Cited

U.S. PATENT DOCUMENTS 6,622,302 B1 * 9/2003 Delaney .................... G06F 8/65
  717/168
7,424,327 B2  9/2008 Grgic et al.
(Continued)

FOREIGN PATENT DOCUMENTS

| DE | 102004055993 A1 | 5/2006 |
| DE | 102016009857 A1 | 2/2018 |
| EP | 1688840 B1 | 6/2017 |

*Primary Examiner* — Tuan A Vu
(74) *Attorney, Agent, or Firm* — Muncy, Geissler, Olds & Lowe, P.C.

(57) ABSTRACT

A procedure for changing, in particular for updating a control program of an input/output module (I/O module), wherein the I/O module is attached side-by-side to a head station of a modular fieldbus node, said procedure comprising transferring data describing the change from the head station via a local bus to the I/O module, wherein the local bus connects the head station to the I/O module, checking the compatibility of the I/O module with the change by the I/O module, and transferring feedback, based on the checked compatibility of the I/O module, from the I/O module via the local bus to the head station; a correspondingly configured I/O module is also presented.

11 Claims, 4 Drawing Sheets

(56) References Cited

U.S. PATENT DOCUMENTS

| | | | |
|---|---|---|---|
| 10,897,652 B1* | 1/2021 | Atkins | H04N 21/2146 |
| 2006/0130073 A1 | 6/2006 | Faist et al. | |
| 2006/0178757 A1* | 8/2006 | Grgic | G05B 19/042 |
| | | | 700/9 |
| 2008/0046104 A1* | 2/2008 | Van Camp | G05B 23/0283 |
| | | | 700/90 |
| 2010/0235614 A1* | 9/2010 | Callaghan | G05B 19/05 |
| | | | 713/1 |
| 2015/0046697 A1* | 2/2015 | Galpin | G09C 1/00 |
| | | | 713/155 |
| 2017/0357497 A1* | 12/2017 | Lin | G06F 8/65 |
| 2019/0173748 A1 | 6/2019 | Gorka | |
| 2020/0225649 A1* | 7/2020 | Cahill | H04L 9/3247 |
| 2020/0228342 A1* | 7/2020 | Nixon | G06F 21/64 |

* cited by examiner

UPDATING COMPONENTS OF A MODULAR SYSTEM

This nonprovisional application claims priority under 35 U.S.C. § 119(a) to German Patent Application No. 10 2019 119 487.3, which was filed in Germany on Jul. 18, 2019, and which is herein incorporated by reference.

BACKGROUND OF THE INVENTION

Field of the Invention

The present invention relates to a fieldbus system. In particular, the present invention relates to an input/output module (I/O module) which is attached side-by-side to a head station (fieldbus coupler) of a modular fieldbus node, wherein the head station has the task of making the data and/or services of the I/O modules, attached side-by-side to the head station, available via the fieldbus to which the head station is connected.

Description of the Background Art

If a manufacturer of components of a fieldbus system provides firmware updates, these must be transferred to the respective components of the fieldbus system in order to be able to replace the previous firmware there. It must be ensured in so doing that the new firmware is compatible with the application environment and in particular with the respective component.

In this context, it is proposed in EP 1 688 840 B1, which corresponds to U.S. Pat. No. 7,424,327, that a head station takes compatibility information from a firmware file transmitted to the head station and compares it with the application environment. If incompatibility is found, the head station refuses to carry out the update and returns a corresponding error message.

SUMMARY OF THE INVENTION

It is therefore an object of the present invention to improve the state of the art.

In an exemplary embodiment, a method of the invention comprises transferring data, which describe a change to a control program of an I/O module, attached side-by-side to a head station of a modular node, from the head station via a local bus to the I/O module, wherein the local bus connects the head station to the I/O module, checking the compatibility of the I/O module with the change by the I/O module, and transferring feedback, based on the checked compatibility of the I/O module, from the I/O module via the local bus to the head station.

Thus, the compatibility of the change with the I/O module is not checked on the head station but on the I/O module, and it is ensured nonetheless that the checking takes place by a routine provided for this purpose.

In this regard, the term "head station," can be understood to be a component of a modular fieldbus node, whose task is to make available the data and/or services of the I/O modules, attached side-by-side to the head station, via the fieldbus to which the head station is connected. Furthermore, the term "transferring," can be understood in particular to mean the transmission of data by means of electrical signals from a sender via a wired transmission path (i.e., the local bus) to a receiver. In this regard, the term "local bus," can be understood in particular to mean a bus via which (only) the I/O modules, attached side-by-side to the head station, are connected to one another and to the head station (in terms of signaling).

Furthermore, the term "checking," can be understood in particular to mean the execution of an instruction sequence that can be executed by a processor and that determines whether the I/O module (presumably) functions as desired after the change has been made. In addition, the term "compatible," can describe in particular a change that produces or maintains a desired functional scope of the I/O module and does not produce any errors during operation.

Preferably, changing the control program comprises updating firmware and/or updating a parameter set.

In this regard, the term "firmware," can be understood in particular to be a set of instruction sequences which are stored in a non-volatile memory of the I/O module and the execution of which can in fact be adapted to an application scenario by the user by means of a parameter set, but which cannot be changed by the user as such but can only be replaced by other instruction sequences. In this context, the term "replace," can be understood to mean in particular the partial or complete overwriting of a set of instruction sequences with other instruction sequences. Furthermore, the term "firmware," can be understood in particular to be instruction sequences tailored to the hardware of the I/O module, i.e., instruction sequences, the execution of which directly (i.e., without intermediate software) changes the state of the hardware (of the I/O module).

If the feedback is positive based on the checked compatibility of the I/O module, an updated firmware and/or a data set from which an updated parameter set can be derived can be transferred to the I/O module. For example, the data describing the change can comprise a version number of the new firmware and the method can further comprise checking whether the version number corresponds to firmware known to be compatible or to a scheme according to which version numbers are assigned to compatible firmware versions.

In this regard, the term "data set," can be understood in particular to be a data packet with information from which a (complete) parameter set to be stored in a non-volatile memory of the I/O module can be derived. The parameter set derived from the data set can, for example, indicate how data are to be derived from signals read in at the inputs of the I/O module and how said data are to be transferred to the head station via the local bus and/or how signals to be output at the outputs of the I/O module are to be derived from the data received from the head station via the local bus. For example, field devices that supply status signals or process control signals can be connected to the inputs and/or outputs. In this respect, the term "field devices," can be understood to be in particular sensors and/or actuators (for example, attached to the I/O module) connected to the I/O module (by signals).

The method can further include checking whether the data set is complete. In this regard, all parameters as well as only a part of the parameters can be considered as necessary. For example, the non-assignment (or deactivation) of an input/output can have the result that no parameter needs to be configured with regard to this input/output. Furthermore, a specific assignment of an input/output can have the result that the parameters defined for the specific assignment must be regarded as necessary and have to be included accordingly. Thus, a data set can be regarded as complete, if it indicates for all or at least all active inputs and/or outputs how to derive data from signals read in at an input of the I/O module and how to transfer said data to the head station via the local bus and how to derive signals to be output at the outputs of the I/O module from the data received from the head station via the local bus.

An I/O module of the invention comprises a control program which is configured to receive data relating to updated firmware or an updated parameter set via a local bus from a head station, to check the compatibility of the I/O module with the updated firmware and/or the updated parameter set, and to transfer feedback, based on the checked compatibility of the I/O module, via the local bus to the head station.

The control program can be configured further, if the feedback is positive, to receive the updated firmware and to initiate an installation of the updated firmware and/or to receive the updated parameter set and to initiate an application of the updated parameter set.

In this regard, the data of the updated firmware can comprise a version number of the updated firmware, wherein the I/O module is configured to check whether the version number corresponds to a version number of firmware known to be compatible or to a scheme according to which version numbers are assigned to compatible firmware versions.

Furthermore, the I/O module can be configured to check whether the updated parameter set is complete.

It is understood in this regard that the I/O module of the invention can be configured to carry out (steps of) the method of the invention and the method of the invention can be implemented using the I/O module of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
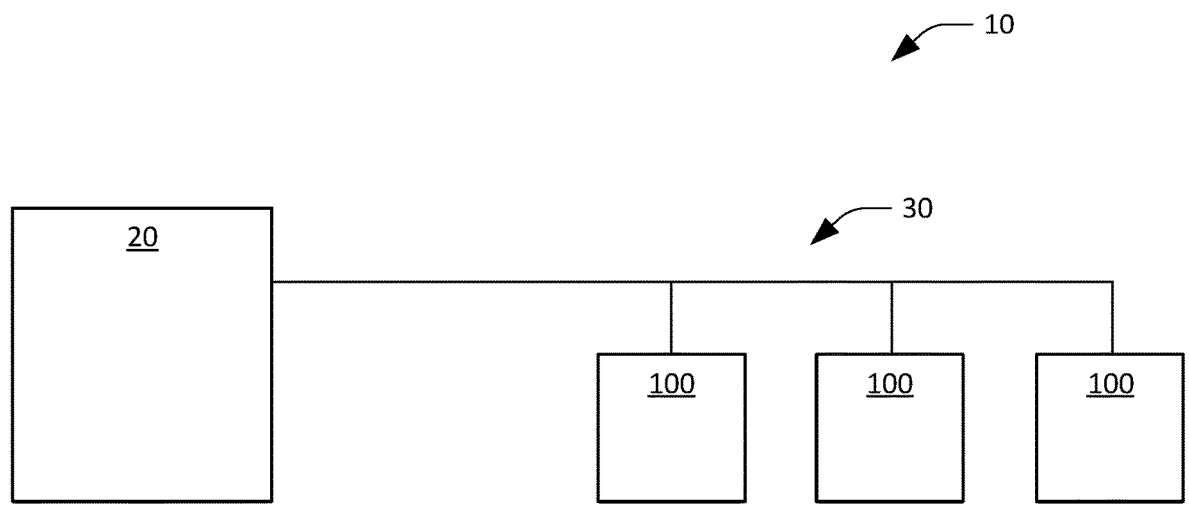
FIG. 1 shows a fieldbus system.

FIG. 1 shows a block diagram of a fieldbus system 10. Fieldbus system 10 comprises a higher-level control unit 20, with which a plurality of modular fieldbus nodes 100 can be connected via a fieldbus 30. The higher-level control unit 20 can be used both for monitoring and for regulating a plant (not shown) which is controlled by fieldbus system 10. If the higher-level control unit 20 monitors a plant, the higher-level control unit 20 can receive from fieldbus nodes 100 cyclically or acyclically status data which describe the state of the plant and generate an error signal or an alarm signal if the state of the plant deviates (substantially) from a desired/permitted state or state range. If the higher-level control unit 20 (not only monitors but also) regulates the plant, the higher-level control unit 20 can receive status data cyclically or acyclically from fieldbus nodes 100 and, taking the status data into account, determine the control data that are transferred to fieldbus nodes 100.

Figure 2:
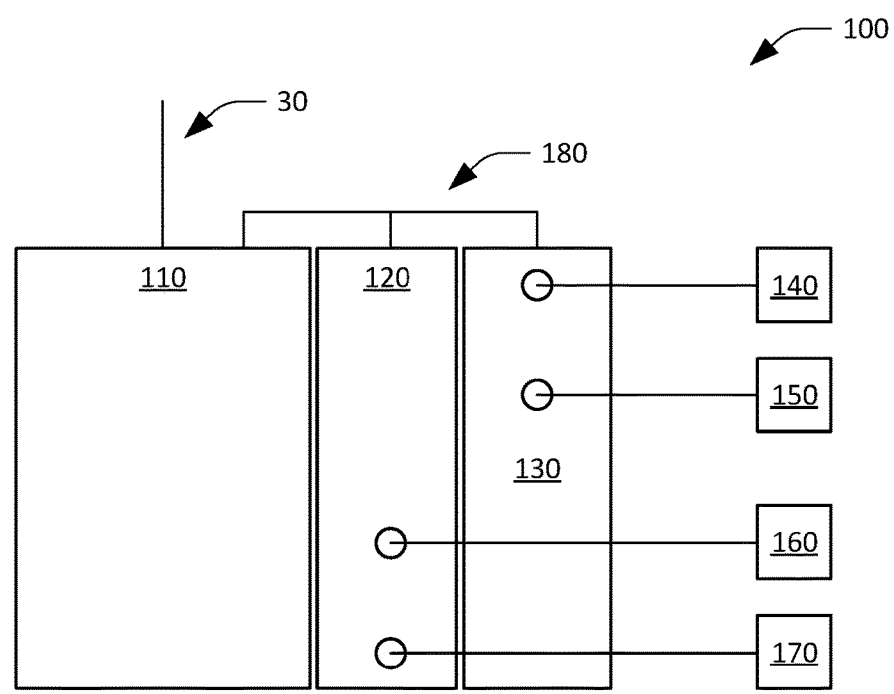
FIG. 2 shows a modular fieldbus node and fieldbus devices connected to the modular fieldbus node.

FIG. 2 shows an exemplary modular fieldbus node 100, consisting of a head station 110 and two I/O modules 120, 130, attached side-by-side to head station 110 and to which field devices 140, 150, 160, 170, such as, for example, sensors and actuators, are connected. During operation, I/O modules 120, 130 read in sensor signals via the inputs and generate status data from the sensor signals, which are transferred to head station 110 via local bus 180. Head station 110 can process the status data locally and/or forward them (possibly in a modified form) to the higher-level control unit 20. The higher-level control unit 20 (or in the case of local processing, head station 110) can then generate control data taking into account the status data.

The control data generated by the higher-level control unit 20 can then be transferred via fieldbus 30 to (the same or) a (different) head station 110. The control data transferred to head station 110 (or generated by head station 110) are then forwarded/transferred (possibly in modified form) to I/O modules 120, 130. I/O modules 120, 130 receive the control data and output control signals corresponding to the control data at the outputs to which the actuators are connected. The communication of data between the components of fieldbus system 10, the mapping of the sensor signals to status data, and the mapping of the control data to control signals can be adapted to different application scenarios by parameterizing fieldbus nodes 100.

Figure 2A:
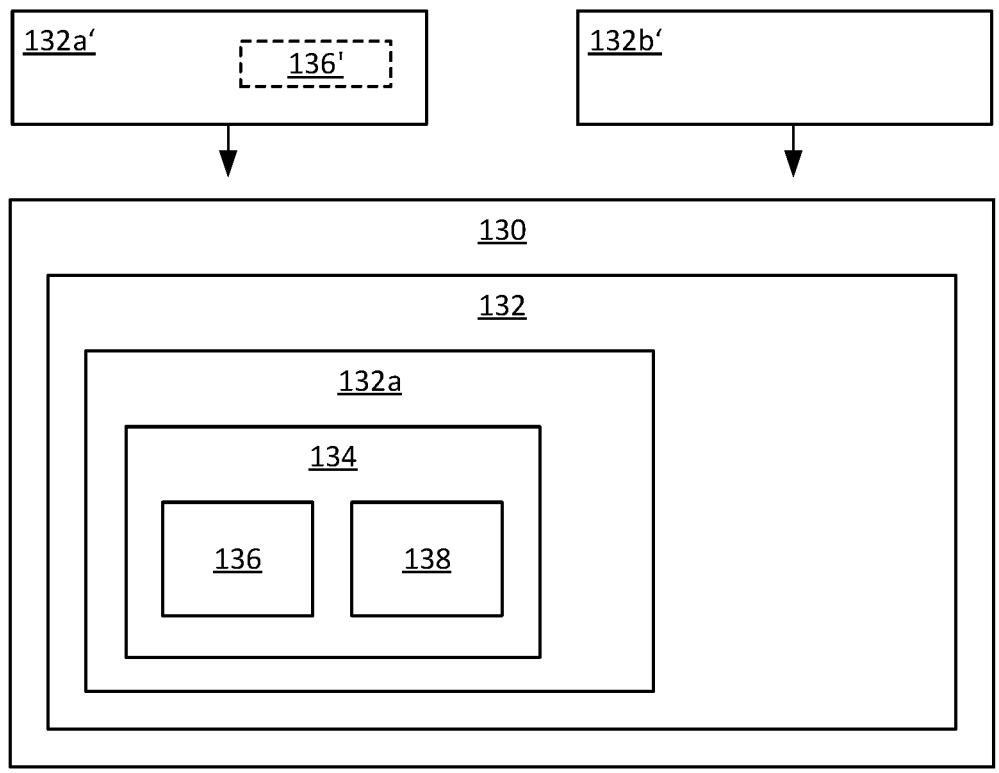
FIGS. 2a and 2b show elements of an exemplary I/O module whose control program is changed.
Figure 2B:
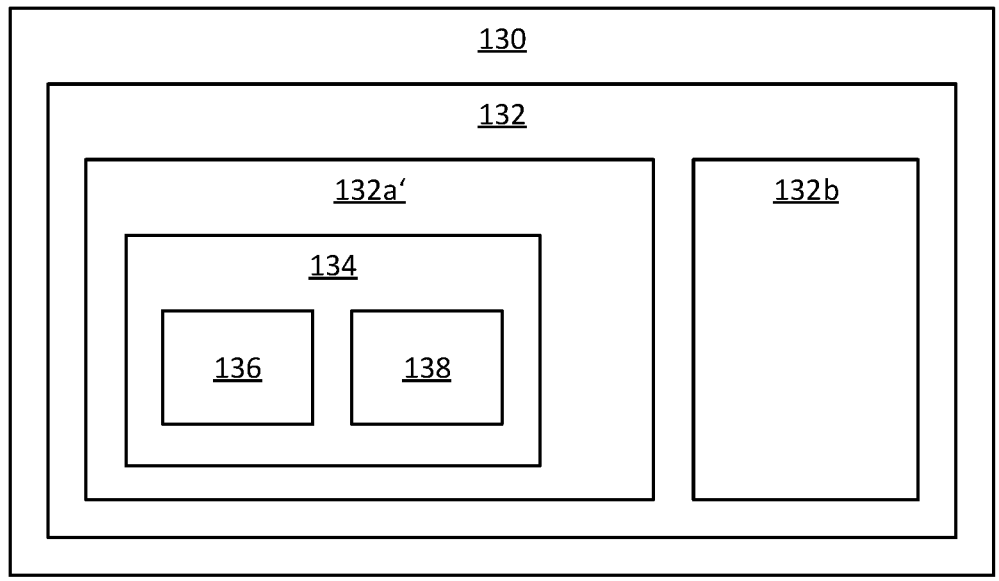

As illustrated in FIGS. 2a and 2b using the example of a component of fieldbus system 10, the components and in particular I/O modules 120, 130 of fieldbus system 10 can have a control program 132 which comprises a firmware 132a and parameter set 132b derived from a data set 132b' (persistently stored on I/O module 130). Control program 132 can be configured to process signals/data using the services provided by firmware 132a, taking into account the parameters of parameter set 132b. In addition to the possibility of changing control program 132 by changing parameter set 132b, more extensive changes can be achieved by changing (replacing) firmware 132a.

Such a replacement can be used, for example, to eliminate errors or generally to improve firmware 132a, so that the replacement is accompanied by an update of firmware 132a. Of course, the reverse approach is also possible in which firmware 132a is replaced by an earlier version, for example, because an updated version is not available for all components of fieldbus system 10 and, for example, components with an updated firmware version and components with non-updated version cannot work together (or only to a limited extent).

In order to ensure that only permissible changes are made to firmware 132a and parameter set 132b, control program 132 can have a check routine 134 (for example, integrated in firmware 132a or running as a software program on I/O module 130), which is configured to check whether a desired change is compatible with I/O module 130. The compatibility of a new firmware 132a' with I/O module 130 can depend, for example, on the hardware of I/O module 130 and can exist if the new firmware 132a' is intended for use on the hardware of I/O module 130, i.e., can support all or at least all essential hardware components (for example, a processor, a memory, and a bus controller) of I/O module 130.

Check routine 134 can be configured further to access a list of version numbers 136 of compatible firmware versions (stored persistently on I/O module 130) for checking the compatibility and, if the version number 136' of new firmware 132a' matches a version number 136 on the list, to provide feedback that the new firmware 132a' is compatible with I/O module 130. Of course, the present invention is not limited to a comparison between version numbers 136, 136'. Rather, a wide variety of (rule-based) check routines 134 can be used in the context of a check for comparing the new firmware 132a' and the hardware of I/O module 130.

For example, check routine 134 can check whether the new version number 136' is formed according to a certain scheme and whether the new version number 136' formed according to this scheme is compatible with I/O module 130. In particular, the scheme can provide that the compatible hardware components or the compatible I/O module series can be taken from the version number 136' of the new firmware 132a', for example, by integrating information about the compatible hardware into the version number 136' (for example, by forming the version number 136' from codes for the hardware components, e.g., in the form of a version number:=ProcessorID.MemoryID.BuscontrolID-.Build, or version number:=SeriesID.Build).

Check routine 134 can also be configured to check whether a suitable and complete parameter set 132b can be derived from a data set 132b'. A parameter set 132b can, for example, be regarded as suitable if it does not comprise any parameters that are not (cannot be) used. Further, a parameter set 132b can be regarded as complete if all parameters for the inputs/outputs used are determined or if parameter set 132b comprises all parameters given on a list 138 with required parameters. A parameter set can then be regarded as complete, for example, if it assigns an assignment rule to all inputs in use (active inputs), from which it follows how current values and/or voltage values measured at the respective input are mapped to status data and if it assigns an assignment rule to all outputs in use (active outputs), from which it follows which current values and/or voltage values are to be generated at the respective output as a function of the control data.

The data describing the change can also include information regarding the parameters specified by data set 132b' (or data set 132b' itself), so that the check routine 134 can check before applying data set 132b' whether parameter set 132b which can be derived from data set 132b' is compatible with I/O module 130. If parameter set 132b which can be derived from data set 132b' is not compatible with I/O module 130, check routine 134 can report this result (of the check) back to head station 110 or reject an application of parameter set 132b. If parameter set 132b which can be derived from data set 132b' is compatible with I/O module 130, check routine 134 can also report this result of the check back to head station 110 and initiate an application of parameter set 132b.

Figure 3:
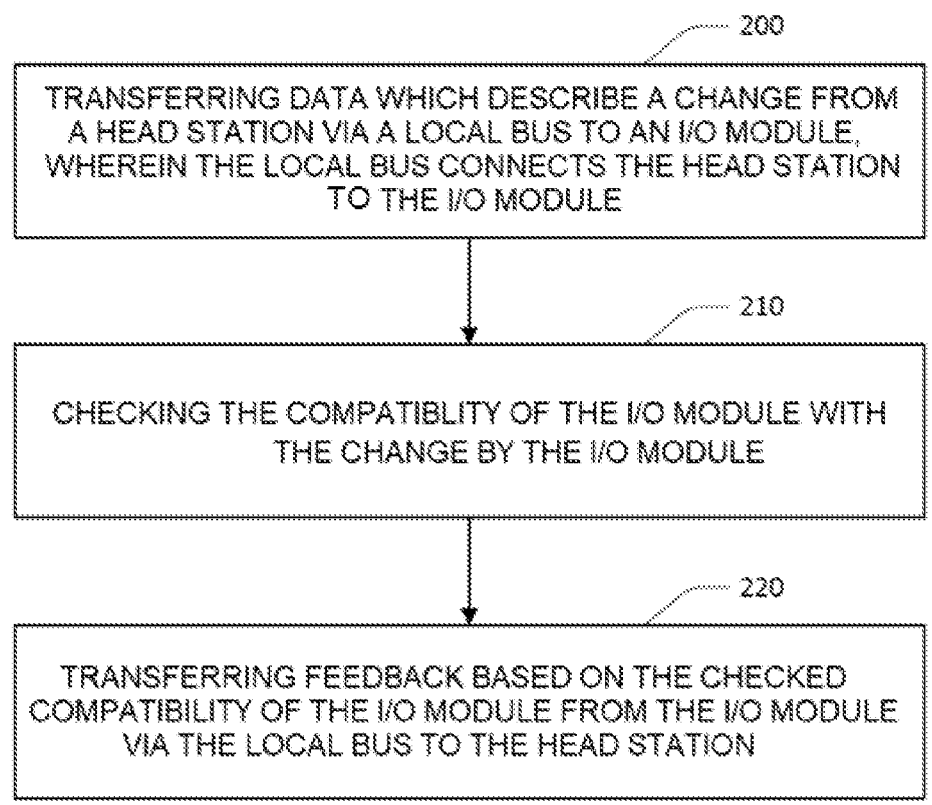
FIG. 3 is a flowchart of a process for changing a control program of an I/O module.

FIG. 3 shows the essential steps of the process described in connection with FIGS. 2a and 2b. Thus, in step 200 data are transferred, which describe the (desired) change, from head station 110 to I/O module 130 via local bus 180 connecting head station 110 to I/O module 130. Said data can be received by head station 110 from higher-level controller 20 or from a computer (not shown) connected to head station 110 (temporarily during the change). In step 210, I/O module 130 then checks whether I/O module 130 is compatible with the change. Feedback regarding the compatibility of I/O module 130 can then be transferred in step 220 from I/O module 130 via local bus 180 to head station 110.

Figure 4:
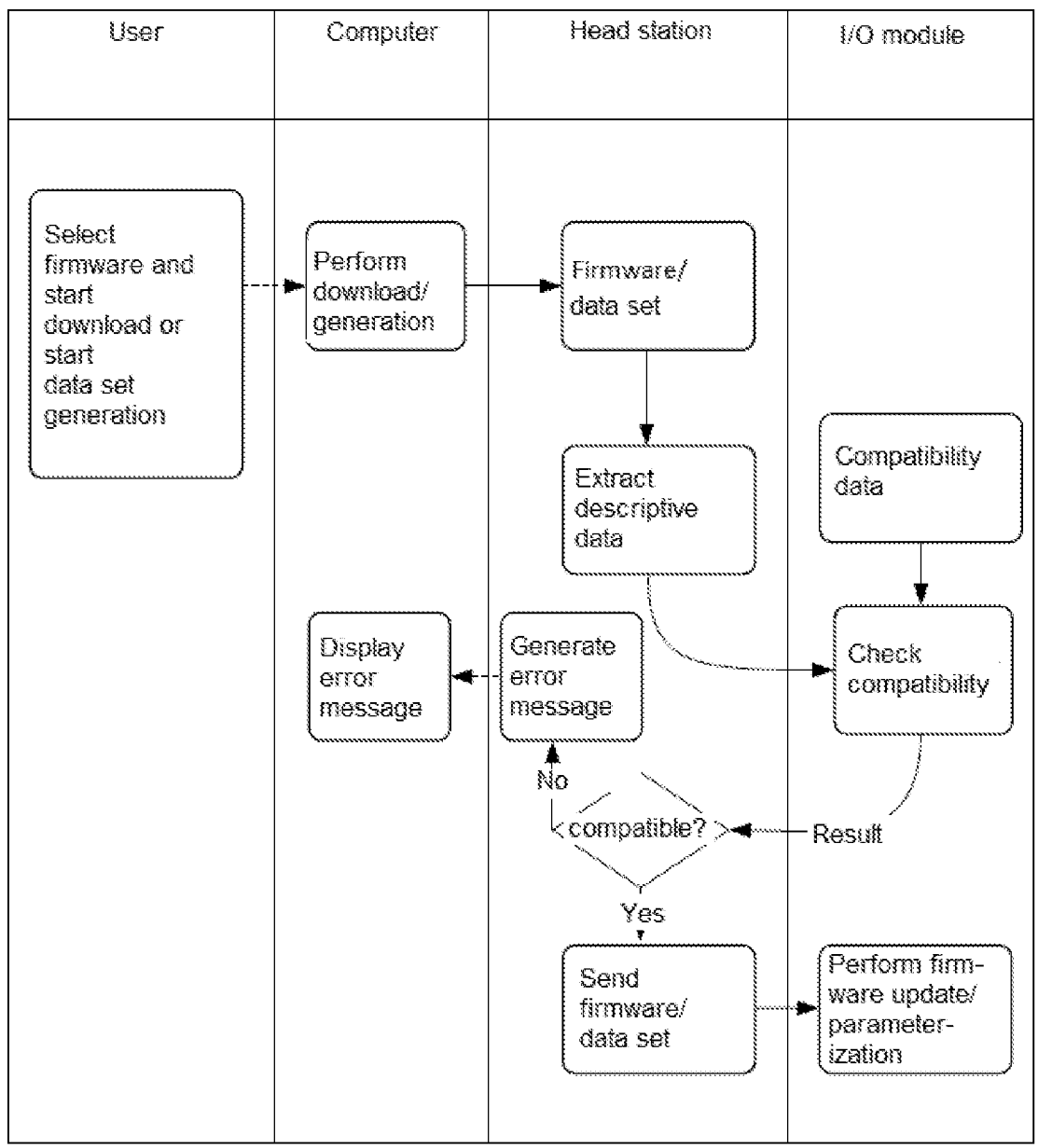
FIG. 4 shows the details of a possible embodiment of the process shown in FIG. 3.

FIG. 4 illustrates details of a possible embodiment of the process shown in FIG. 3. This starts with the selection of a new firmware 132a' or the generation of a data set 132b'. Then firmware 132a' or the data describing data set 132b' (in the simplest case firmware 132a' or data set 132b' itself) are transferred to head station 110. Head station 110 can then forward the descriptive data to I/O module 130 or, as shown in FIG. 4, extract the descriptive data from firmware 132a' or data set 132b' and transfer it to I/O module 130.

I/O module 130 can then compare the received data with compatibility data (for example, with I/O module version information) and report the result of the comparison back to head station 110. If I/O module 130 is compatible with the new firmware 132a' or with data set 132b', head station 110 can transfer new firmware 132a' or data set 132b' to I/O module 130, where the new firmware 132a' is installed or the parameterization is carried out. If I/O module 130 is not compatible with the new firmware 132a' or with data set 132b', head station 110 can generate an error message which is displayed to the user by the computer. In addition, it is understood that control program 132 of I/O module 120 can be changed analogously.

Performing the check on I/O modules 120, 130 achieves the following advantages:

Head station 110 does not require any knowledge of I/O modules 120, 130, attached side-by-side, and the compatibility check routine is also limited to the affected I/O module 120, 130.

The compatibility check in the affected I/O modules 120, 130 can also provide the correct results for future changes, even if there are new rules for this check that result from the introduction of new I/O modules 120, 130.

The compatibility check in the affected I/O modules 120, 130 can also be updated as part of a firmware update.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for changing a control program of an input/output module, wherein the I/O module is attached side-by-side to a head station of a modular fieldbus node, the method comprising:
   transferring data describing a change of the control program from the head station to the I/O module via a local bus, the local bus connecting the head station to the I/O module;
   checking, by the I/O module, a compatibility of the I/O module with the change of the control program; and
   transferring feedback, that is based on the checked compatibility of the I/O module with the change of the control program, from the I/O module to the head station via the local bus.

2. The method according to claim 1, wherein the change of the control program comprises updating firmware and/or updating a parameter set.

3. The method according to claim 1, further comprising:
   transferring, if the feedback based on the checked compatibility of the I/O module with the change of the control program is positive, updated firmware and/or a data set from which an updated parameter set is derived to the I/O module.

4. The method according to claim 3, wherein the data describing the change of the control program comprises a version number of the updated firmware.

5. The method according to claim 4, further comprising:
checking whether the version number corresponds to a firmware known to be compatible or corresponds to a scheme according to which version numbers are assigned to compatible firmware versions.

6. The method according to claim 3, further comprising:
checking whether the data set is complete.

7. An I/O module comprising:
a control program that is configured to:
  receive data of an updated firmware and/or an updated parameter set from a head station via a local bus;
  check a compatibility of the I/O module with the updated firmware and/or the updated parameter set; and
  transfer feedback, that is based on the checked compatibility of the I/O module with the updated firmware and/or the updated parameter set, to the head station via the local bus.

8. The I/O module according to claim 7, wherein, if the feed back is positive, the control program is further configured to receive the updated firmware and to initiate an installation of the updated firmware and/or to receive the updated parameter set and to initiate an application of the updated parameter set.

9. The I/O module according to claim 7, wherein the data of the updated firmware comprises a version number of the updated firmware.

10. The I/O module according to claim 9, wherein the I/O module is configured to check whether the version number corresponds to a firmware known to be compatible or to a scheme according to which version numbers are assigned to compatible firmware versions.

11. The I/O module according to claim 7, wherein the I/O module is configured to check whether the updated parameter set is complete.

* * * * *